GENERATOR FOR ELECTRONIC MUSCLE STIMULATOR

Filed Sept. 12, 1958 2 Sheets-Sheet 1

Inventors
John I. Moss
William J. Browner
By Schroeder, Hofgren, Brady & Wegner
Attorneys Inventors
John I. Moss
William J. Browner
By Schroeder, Hofgren, Brady & Wegner
Attorneys 3,108,597

GENERATOR FOR ELECTRONIC MUSCLE STIMULATOR

John I. Moss, Skokie, Ill., and William J. Browner, San Leandro, Calif., assignors to Relaxacizor, Inc., a corporation of California Filed Sept. 12, 1958, Ser. No. 760,635
6 Claims. (Cl. 128—422)

This invention relates to an electronic apparatus for generating electrical signals particularly designed for simulating muscle activity.

It is well-known that certain types of electrical impulses may be utilized for stimulating muscle action to achieve and maintain muscle tone and to eliminate soft flabby body tissue. This invention relates to a novel circuit for producing an improved electrical signal which achieves these results safely and efficiently.

A principal object of the invention is to provide a completely transistorized circuit for generating muscle stimulating signals.

Another object is to provide an electronic muscle stimulator including an electronic timing oscillator, switch means having first and second conditions, actuated by the timing oscillator, a pulse generator connected with the switch means and having an operative and an inoperative condition responsive to the switch means, together with means connected with the pulse generator for utilizing the pulses in the stimulation of muscle fibres. A further object is to provide such a device in which the switch means is in the power circuit for the blocking oscillator, and the power circuit includes a reactive element providing a gradual increase and decrease of the amplitude of the pulses at the start and finish of a timing period, respectively.

Still another object is to provide such a stimulator in which a timing multivibrator actuates the switch means. Yet a further object is to provide such a stimulator in which a timing pulse oscillator actuates a pulse responsive relay having switch means associated therewith which are actuated between a first condition and a second condition on successive pulses of the timing oscillator. Yet another object is to provide such a device in which the output of the pulse generator is coupled to an output transistor having a plurality of load circuits connected therewith, the output transistor having a saturation level which limits the current in the load circuits.

Further objects and advantages will become apparent from the following detailed description taken in connection with the accompanying drawings in which.

Figures 1, 2:
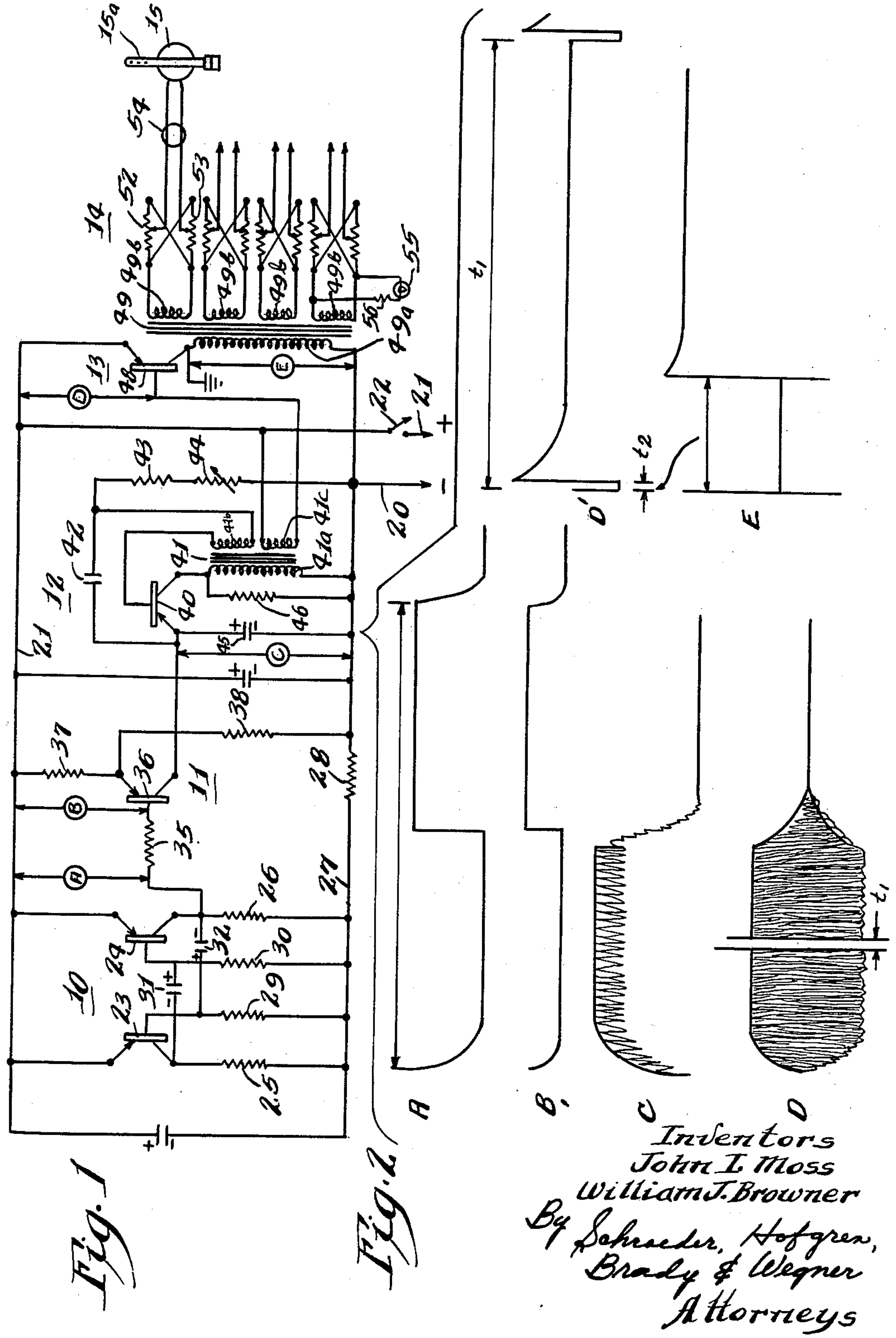
FIGURE 1 is a schematic diagram of an embodiment of the invention.
FIGURE 2 is a series of voltage wave forms taken as indicated in FIGURE 1 illustrating the operation of the circuit.

While this invention is susceptible of embodiments in many different forms, there are shown in the drawings and will herein be described in detail a preferred embodiment of the invention and a modification thereof with the understanding that the present disclosure is to be considered as an exemplification of the principles of the invention and is not intended to limit the invention to the embodiment illustrated. The scope of the invention will be pointed out in the appended claims.

Muscle stimulators of the general character disclosed herein are gaining increasingly wide acceptance for home use. The signals generated not only stimulate and exercise the muscles improving tone and reducing flab, but also have a relaxing effect on the user, reducing tension from worry, overwork and the like. One problem with previous apparatus is that it includes electronic circuits energized from a 110 volt standard service circuit and incorporates high voltage electronic tubes. The pads, or devices which are applied to the body to transmit the generated pulses to the muscles, must be moistened to improve the contact conductivity with the body, and while such apparatus is perfectly safe, a great deal of consumer resistance is encountered as a result of the fear of electrical shock. The novel system disclosed herein, utilizing transistor circuitry operating at a relatively low voltage, not only produces an improved muscle stimulating pulse, but also allays the fears of technically uneducated users regarding the safety of the device.

Turning now to FIGURE 1 of the drawings, the schematic there shown includes a transistor timing oscillator 10 which actuates a transistor switch 11. The switch in turn controls operation of transistor blocking oscillator 12, the output of which is coupled through output transistor 13 to a plurality of load circuits 14. The pulses appearing in load circuits 14 may be applied to the appropriate muscle actuating points of the user, as through a pad 15 equipped with strap **15*a*** for securing the pad to the body. Various types of applicator pads of different sizes and shapes may be used in stimulating different muscles.

The circuit of FIGURE 1, and its operation, will now be described in some detail, and values and type designations will be given for many of the circuit elements. It is to be understood that these specific figures are given primarily for the purpose of disclosing an operative embodiment of the invention, and the values are not to be considered critical. Many changes and modifications will readily be apparent to those skilled in the art.

The circuit is energized from a suitable source, as 24 volts D.C. with the indicated polarity, connected to terminals 20 and 21, the power circuit being provided with an on-off switch 22. Multivibrator 10 includes a pair of PNP transistors 23 and 24, each a 2N381, and each having its emitter electrode connected with power lead 21. The collectors of the transistors are returned, through resistors 25 and 26, each 5600 ohms, to power lead 27, which is connected through dropping resistor 28, 5600 ohms, with power lead 20. The base electrodes of the two transistors are connected to power lead 27 through resistors 29 and 30, each 180,000 ohms. The collector of transistor 23 is connected with the base of transistor 24 through coupling capacitor 31, 3 $\mu$f. (microfarad), and the collector of transistor 24 is connected with the base of transistor 23 by capacitor 32, also 3 $\mu$f.

The output signal of multivibrator 10 is illustrated in FIGURE 2A and comprises an essentially square wave pulse having a period *t* of the order of one and one-half seconds. This wave form is taken across transistor 24, as indicated in FIGURE 1. The square wave timing pulse is coupled from multivibrator 10 through dropping resistor 35 to the base of PNP switching transistor 36, a 2N381, appearing at the base in reduced amplitude (FIGURE 2B). The emitter of switch transistor 36 is connected to the juncture of resistors 37, 560 ohms, and 38, 6800 ohms, forming a voltage divider between power leads 21 and 20. The blocking oscillator 12 is connected between the collector electrode of switch transistor 36 and power lead 20, transistor 36 serving to turn the energizing power for the blocking oscillator on and off, in accordance with the timing pulses from multivibrator 10.

Blocking oscillator 12 comprises a PNP transistor 40, 2N381, having its emitter connected to the collector of transistor 36, and its collector connected through the primary winding **41*a* of transformer 41, to power lead 20. A feedback winding 41*b* has one terminal connected with the base electrode of transistor 40** and the other terminal connected with a feedback circuit including capacitor 42, 2 μf., connected to the emitter electrode of transistor 40, and a resistive network including resistor 43, 15,000 ohms, and potentiometer 44, 25,000 ohms, to power lead 20. A capacitor 45, 8 μf., is connected between the emitter element of transistor 40 and power lead 20.

When switch transistor 36 is rendered conductive by the timing signal from multivibrator 10, blocking oscillator transistor 40 is essentially connected between power leads 21 and 20 through resistor 37 and the collector impedance of the switching transistor. As transistor 40 begins to conduct, the change in current in primary winding 41*a* induces a current in winding 41*b* charging capacitor 42, applying a negative voltage to the emitter of the transistor. This cuts the transistor off providing a pulse type oscillation. The charge on capacitor 42 drains off through resistors 43 and 44, whereupon the operation repeats. Resistor 46, 1000 ohms, shunts primary winding 41*a*, damping the oscillation and preventing a reverse potential from being applied to transistor 40.

The frequency or repetition rate of the pulses of the blocking oscillator is determined by the setting of variable resistor 44, and with the values of circuit components given above, a range of the order of 50 to 150 cycles per second is possible.

The power circuit for blocking oscillator transistor 40 includes capacitor 45, connected in series with the collector impedance of the switch transistor 36 and resistor 37, and shunting the oscillator. When the switch is closed, i.e. when transistor 36 begins to conduct, capacitor 45 tends to charge along an exponential curve, the slope of which is determined by the relative values of the capacitor and the impedance of the charging circuit. The time constant of the charging circuit should be large with respect to the period of the blocking oscillator. This charging curve is illustrated in the left-hand portion of FIGURE 2C, from which it will be noted that the operating voltage for the blocking oscillator builds up gradually. Similarly, when transistor 36 is cut off, opening the switch, capacitor 45 tends to discharge along an exponential curve. As a result, the amplitude of the oscillations of blocking oscillator 40 increase gradually at the start of the operative period of the oscillator and decrease gradually at the termination thereof. This is illustrated by the wave form of FIGURE 2D, taken across output winding 41*c* of transformer 41. FIGURE 2D′, shows, on an expanded time base $t_1$, the wave form of one cycle of operation of the blocking osciillator.

In operation, the blocking oscillator has a duty cycle of about 50%, providing the desired pulsed output for approximately three-quarters of a second, and no output (a rest period) for three-quarters of a second. The gradual increase in the amplitude of the pulses upon initiation of the active portion of the cycle, and the gradual decrease on termination is extremely effective in conditioning the user to the stimulation. Where the signals start and stop abruptly, some users develop a fear of the impending stimulation and the desirable relaxing effect is not achieved.

The output from the blocking oscillator is coupled to the base element of transistor 48, 2N301, in output circuit 13. The emitter of transistor 48 is connected to power lead 21 and the collector is connected through the primary winding 49*a* of output transformer 49, with power lead 20. The pulses (wave form 2D) applied to output transistor 48 act as switching signals, turning the transistor on or off. The voltage wave form across primary winding 49*a* is essentially that of the signal applied to the base of output transistor 48. A portion $t_2$ of waveform D′ is illustrated in FIGURE 2E, showing the pulse portion of the wave on a greatly expanded time base.

A plurality of secondary load windings, here four, are provided on transformer 49, and are each designated 49*b*. Connected with each secondary winding is a phase-reversing, amplitude-varying resistive network made up of two variable resistors 52 and 53, which are cross connected with the terminals of the secondary winding. The movable taps of the two resistors are connected through a suitable cable 54 with pad 15.

The circuit of output transistor 48 is such that the transistor is saturated by the pulses from the blocking oscillator. Where the impedance in the collector or load circuit is large, i.e. no load on the system, the amount of current passed on each pulse depends primarily on this impedance. The collector to emitter voltage drops to a fraction of a volt and the voltage across the primary winding 49*a* of the output transformer is substantially the same as the supply voltage between leads 21 and 20. However, as the currents drawn by the loads connected to output windings 49*b* increase, the current in the output transistor circuit is limited by saturation of the transistor. With a condition which may be considered as normal operation, all four outputs set at about seven-eights of their maximum output potential, transistor 48 operates at seventy to eighty percent of saturation, and has a low alternating current impedance until saturation is reached. The output or load windings 49*b* of transformer 49 are tightly coupled with primary winding 49*a*. Thus, there is very little loss of power in the output circuit, and when the setting of the output circuit is varied, changing the load on the system, the voltage applied to the other loads is not effected substantially, as the current drawn through the primary winding depends upon the load impedance. This provides a high degree of stability in operation so that a change in the condition of one output circuit does not require re-adjustment of the others.

An indicator lamp 55 is connected across one of the output windings 49*b*, through a resistor 56. This lamp not only provides an indication of output when the circuit is operating, but also serves to give notice to the operator when the power supply battery voltage is low, as the lamp will not light. In a typical circuit, the lamp may be a General Electric type 344, with resistor 56, 100 ohms.

Figure 3:
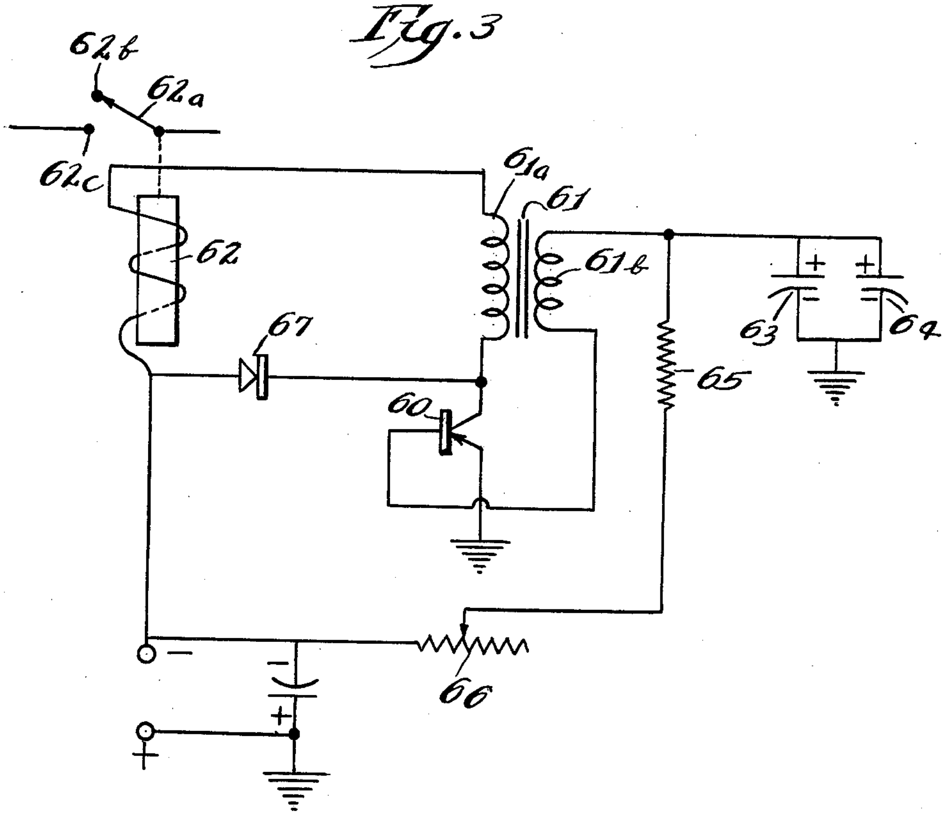
FIGURE 3 is a modification of a portion of the circuit of FIGURE 1.

A modified form of a portion of the invention is illustrated in FIGURE 3. Here, a transistor 60, 2N381, is connected in a blocking oscillator circuit, by means of a feedback transformer 61 having a primary winding 61*a* in the collector circuit and secondary winding 61*b* in the circuit of the base. Connected in series with primary winding 61*a* is a pulse actuated relay 62 having associated therewith a switch 62*a*. This relay is so constructed that when a pulse of current is applied thereto the movable switch member 62*a* is transferred from contact 62*b* to contact 62*c*. With the next pulse applied to relay 62, the position of the switch is reversed. Relays of this type may be obtained from many relay manufacturers, as Comar Electric Co., Chicago, Illinois.

When transistor 60 begins to conduct, at the start of a cycle of operation, the current flowing through winding 61*a* induces a current in winding 61*b* charging capacitors 63 and 64, cutting the transistor off. This charge then drains from capacitors 63 and 64 through resistors 65 and 66, the time constant of the circuit determining the frequency of operation of the blocking oscillator. Diode 67 prevents the application of reverse potentials to transistor 60. The successive pulses applied to relay 62 cause actuation of movable contact 62*a* as described above.

Switch 62*a*, associated with relay 62, may be used in place of transistor 36 in the circuit of FIGURE 1, to effect control of the operation of pulse generating oscillator 40.

We claim:

1. In an electronic muscle stimulator means for generating electrical signals for muscle stimulation, comprising: a transistor multivibrator; a transistor switch connected with said multivibrator, having a first condition and a second condition and being periodically actuated from one condition to the other by said multivibrator; a repetitive transistor blocking oscillator; a power circuit for said oscillator, including said transistor switch, for rendering said oscillator operative in one condition of the transistor switch and inoperative in the other said oscillator producing a series of pulses during the period when operative; an output circuit including an output switching transistor and primary winding of an output transformer connected across a source of potential, a control element of said output switching transistor being connected to said blocking oscillator; and a plurality of load circuits each including a secondary winding on said transformer, said output transistor having a saturation level limiting the maximum current through the primary of said transformer during conditions of heavy load on said load circuits.

2. In an electronic muscle stimulator means for generating electrical signals for muscle stimulation, comprising: an electronic timing oscillator; switch means having a first condition and a second condition, periodically actuated by said oscillator from one condition to the other; a repetitive pulse generator; a power circuit for said pulse generator, including said switch means, for rendering said pulse generator operative in one condition of the switch means and inoperative in the other; and a reactive circuit element in said power circuit, said circuit having a time constant greater than the period of said pulse generator to vary the amplitude of the pulses from said generator.

3. In an electronic muscle stimulator, means for generating electrical signals for connection with a plurality of applicators, for muscle stimulation, comprising: an electronic timing oscillator; switch means having a first condition and a second condition, periodically actuated by said timing oscillator from one condition to the other; a pulse generator connected with said switch means and having an operative and inoperative condition, dependent on the condition of said switch means; an output circuit including an output switching transistor; and an output transformer having a primary winding connected in series with the output switching transistor across a source of potential, said transistor having a control element connected with said pulse generator, and said transformer having secondary winding means with a plurality of adjustable load circuits connected thereto, for connection with said applicators, said output transistor being driven to saturation by the signal from said pulse generator and limiting the variation of current through the primary of said transformer with adjustment of said loads.

4. In an electronic muscle stimulator, means for generating electrical signals for connection with a plurality of applicators, for muscle stimulation, comprising: an electronic timing oscillator; switch means having a first condition and second condition, periodically actuated by said timing oscillator from one condition to the other; a pulse generator connected with said switch means having an operative and inoperative condition, dependent on the condition of said switch means, said pulse generator including a transistor having an output circuit including the primary winding of an output transformer; and a plurality of adjustable load circuits each including a secondary winding of said transformer and having one of said applicators connectable therewith, said transistor when conducting being saturated, the current in the load circuit being limited to a value less than that which produces dangerous energization of said applicators.

5. In an electronic muscle stimulator, means for generating electrical signals for muscle stimulation, comprising: an electronic timing oscillator; switch means having a closed condition and an open condition, periodically actuated by said oscillator from one condition to the other; a repetitive pulse generator; a power circuit for said pulse generator including said switch means, for rendering said pulse generator operative in the closed condition of said switch means and inoperative in the open condition thereof; a resistive element in said power circuit; and a capacitor connected in shunt with said pulse generator across said power circuit, said resistive element and capacitor having a time constant greater than the period of said pulse generator, the amplitude of the output of said pulse generator being a function of the operating potential applied thereto, whereby the initial pulses in each period of operation are at a lower amplitude than pulses at the end of the period.

6. In an electronic muscle stimulator, means for generating electrical signals for muscle stimulation, comprising: a free-running electronic timing oscillator; a repetitive transistor blocking oscillator; a source of operating power for said oscillator; a power circuit for connecting said blocking oscillator with said power source; switch means having an open position and a closed position and actuated between them by the output of said timing oscillator, said switch means being connected in said power circuit, periodically opening and closing the circuit; and a reactive circuit element in said power circuit, the power circuit having a time constant greater than the period of said blocking oscillator, to vary the amplitude of the pulses from said blocking oscillator, said pulses having a lower amplitude at the start of an operating period than at the end thereof, and the blocking oscillator having a period much shorter than the period of the timing oscillator.

References Cited in the file of this patent

UNITED STATES PATENTS

| | | |
|---|---|---|
| 2,226,514 | Pignolet | Dec. 24, 1940 |
| 2,586,803 | Fleming | Feb. 26, 1952 |
| 2,590,216 | Schuhfried | Mar. 25, 1952 |
| 2,668,540 | Browner | Feb. 9, 1954 |
| 2,704,064 | Fizzell et al. | Mar. 15, 1955 |
| 2,748,380 | Platte et al. | May 29, 1956 |
| 2,773,220 | Aron | Dec. 4, 1956 |
| 2,847,568 | Saucedo | Aug. 12, 1958 |
| 2,848,992 | Pigeon | Aug. 28, 1958 |
| 2,873,384 | Schoen et al. | Feb. 10, 1959 |
| 2,902,658 | Erdman | Sept. 1, 1959 |
| 2,949,547 | Zimmermann | Aug. 16, 1960 |

OTHER REFERENCES

Montgomery article, IRE Trans. On Medical Electronics, July 1958, pages 38–40.

Molyneux article, Electronic Engineering, March 1957, pages 125–127.